(12) United States Patent
Pegram et al.

(10) Patent No.: US 6,663,801 B2
(45) Date of Patent: Dec. 16, 2003

(54) SILICON CARBIDE IR-EMITTER HEATING DEVICE AND METHOD FOR DEMOLDING LENSES

(75) Inventors: Stephen C. Pegram, Jacksonville, FL (US); Allan W. Kimble, Jacksonvilee, FL (US); Leslie A. Voss, Jacksonville, FL (US); Thomas P. Bingaman, Jacksonville, FL (US); Joseph W. Ricard, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 26 days.

(21) Appl. No.: 09/827,995

(22) Filed: Apr. 6, 2001

(65) Prior Publication Data

US 2002/0145211 A1 Oct. 10, 2002

(51) Int. Cl.7 ................................................. B29D 11/00
(52) U.S. Cl. ....................... 264/1.36; 264/2.7; 425/143; 425/174.4; 425/436 RM; 425/808
(58) Field of Search ............................... 264/1.36, 2.7, 264/492, 493; 425/143, 174.4, 808, 436 RM

(56) References Cited

U.S. PATENT DOCUMENTS

| | | | |
|---|---|---|---|
| 3,805,024 A | * 4/1974 | Joeckel et al. ........... 219/467.1 |
| 3,935,292 A | 1/1976 | Okubo et al. |
| 4,121,896 A | 10/1978 | Shepherd |
| 4,150,073 A | 4/1979 | Neefe |
| 4,155,962 A | 5/1979 | Neefe |
| 4,159,292 A | 6/1979 | Neefe |
| 4,311,654 A | 1/1982 | Blandin |
| 4,347,198 A | 8/1982 | Ohkada et al. |
| 4,495,313 A | 1/1985 | Larsen |
| 4,497,754 A | 2/1985 | Padoan |
| 4,565,348 A | 1/1986 | Larsen |
| 4,640,489 A | 2/1987 | Larsen |
| 4,761,069 A | 8/1988 | Truong et al. |
| 4,786,444 A | 11/1988 | Hwang |
| 4,889,664 A | 12/1989 | Kindt-Larsen et al. |
| 4,909,969 A | 3/1990 | Wood |
| 5,013,496 A | 5/1991 | Nagata et al. |
| 5,015,280 A | 5/1991 | Kimoto et al. |
| 5,039,459 A | 8/1991 | Kindt-Larsen et al. |
| 5,080,839 A | 1/1992 | Kindt-Larsen |
| 5,094,609 A | 3/1992 | Kindt-Larsen |
| 5,143,660 A | 9/1992 | Hamilton et al. |
| 5,294,379 A | 3/1994 | Ross et al. |
| 5,326,505 A | 7/1994 | Adams et al. |
| 5,358,672 A | 10/1994 | Blum |
| 5,417,557 A | 5/1995 | Ross et al. |
| 5,435,943 A | 7/1995 | Adams et al. |
| 5,540,140 A | 7/1996 | Rubio et al. |
| 5,542,978 A | 8/1996 | Kindt-Larsen et al. |
| 5,569,474 A | 10/1996 | Kitaichi et al. |
| 5,573,715 A | 11/1996 | Adams et al. |
| 5,690,865 A | 11/1997 | Kindt-Larsen et al. |
| 5,693,268 A | 12/1997 | Widman et al. |

(List continued on next page.)

FOREIGN PATENT DOCUMENTS

| | | |
|---|---|---|
| EP | 0775571 A2 | 5/1997 |
| WO | WO 9819854 | 5/1998 |

OTHER PUBLICATIONS

Marketing CD on the Light Stream Process for producing CibaVision Contact Lenses.
European Product Documentary on B&L Factory.

*Primary Examiner*—James P. Mackey
*Assistant Examiner*—Donald Heckenberg

(57) ABSTRACT

A method and a device for removing molded soft contact lenses, high-precision intraocular lenses and the like, from the individual molds in which they are produced. Provided is an infra-red radiation or heater device constituted of silicon carbide IR-emitters, and which employs an individual infra-red emitter for each individual mold, to impart a desired thermal gradient.

37 Claims, 5 Drawing Sheets

U.S. PATENT DOCUMENTS

| | | |
|---|---|---|
| 5,744,357 A | 4/1998 | Wang et al. |
| 5,770,119 A | 6/1998 | Walker et al. |
| 5,804,107 A | 9/1998 | Martin et al. |
| 5,820,895 A | 10/1998 | Widman et al. |
| 5,849,209 A | 12/1998 | Kindt-Larsen et al. |
| 5,850,107 A | 12/1998 | Kindt-Larsen et al. |
| 5,965,172 A | 10/1999 | Wang et al. |
| 6,033,603 A | 3/2000 | Lesczynski et al. |
| 6,039,899 A | 3/2000 | Martin et al. |
| 6,071,440 A | 6/2000 | Wang et al. |
| 6,143,210 A | 11/2000 | Wrue et al. |
| 6,171,529 B1 | 1/2001 | de Marignan et al. |
| 2002/0079609 A1 | 6/2002 | Dobner et al. |
| 2002/0145211 A1 | 10/2002 | Pegram et al. |

\* cited by examiner

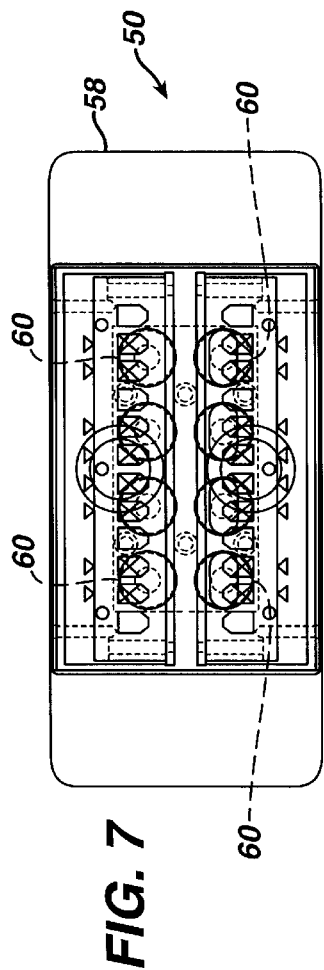
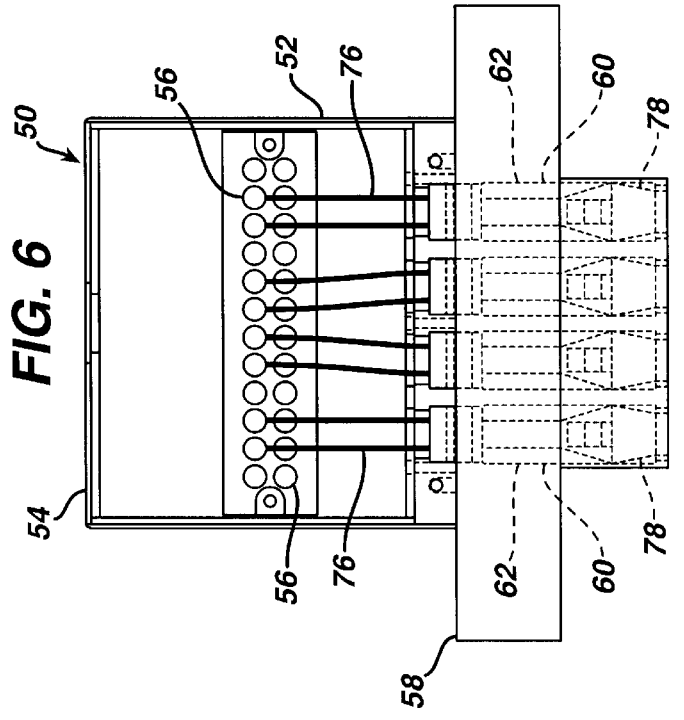
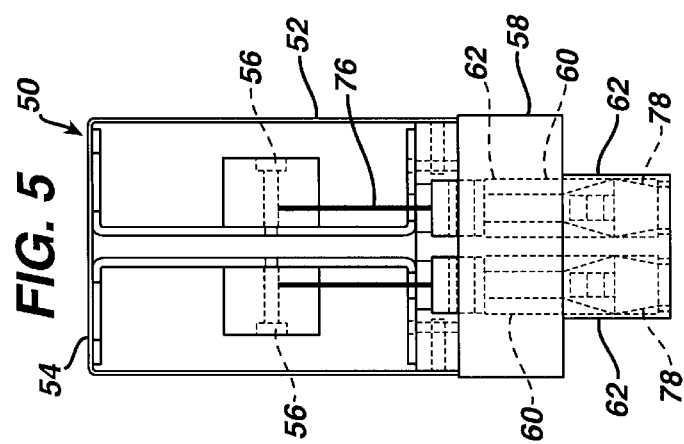

SILICON CARBIDE IR-EMITTER HEATING DEVICE AND METHOD FOR DEMOLDING LENSES

BACKGROUND OF THE INVENTION

1. Field of the invention

The present invention relates generally to the production of ophthalmic lenses, and, in particular pertains to a method and a device for removing molded soft contact lenses, high-precision intraocular lenses and the like, from the individual molds in which they are produced.

2. Discussion of the Prior Art

In view of the intense growth of the ophthalmic contact lens industry, it has become desirable and even necessary to be able to supply contact lenses which are periodically and frequently replaced in order to minimize the possibility of user induced contamination. This has created an opportunity for manufacturers to strive for automated methods and apparatuses that are able to automatically produce high quality ophthalmic lenses in a cost-effective and highly efficient manner.

It is currently the practice in the manufacturing technology for ophthalmic lenses, such as soft contact lenses of the hydrogel type, to form a monomer or monomer mixture that may be polymerized in a plastic mold. Details of typical direct mold processes for forming soft hydrogel contact lenses are described in U.S. Pat. Nos. 5,080,839, 5,039,459, 4,889,664, and 4,495,313. The process for forming soft contact lenses as generally described in the above-mentioned patents includes the steps of dissolving a monomer mixture in a non-aqueous, water-displaceable solvent and placing the monomer/solvent mixture in a mold having the shape of the final desired hydrogel lens. Thereafter, the monomer/solvent mixture is subjected to conditions whereby the monomer(s) polymerize, to thereby produce a polymer/solvent mixture in the shape of the final desired hydrogel lens. After the polymerization is complete, the solvent is displaced with water to produce a hydrated lens whose final size and shape are similar to the shape of the original molded polymer/solvent article.

Examples of typical plastic molds used for carrying the polymerizable feed material are disclosed in U.S. Pat. Nos. 5,094,609, 4,565,348 and 4,640,489. The mold disclosed in U.S. Pat. No. 4,640,489 is a two-piece mold with a female mold portion having a generally concave lens surface, and a male mold portion having a generally convex lens surface, both mold portions preferably made of a thermoplastic material such as polystyrene. As discussed in U.S. Pat. No. 4,640,489, polystyrene and copolymers thereof are preferred mold materials because they do not crystallize during cooling from the melt, and exhibit little or no shrinkage when subject to the processing conditions required during the direct molding process discussed above. Alternatively, it is also possible to employ molds made of polypropylene or polyethylene, such as described in U.S. Pat. No. 4,121,896.

During the molding process, the monomer and monomer mixture is supplied in excess to the female concave mold portion prior to the mating of the molds. After the mold portions are placed together, defining the lens and forming a lens edge, the excess monomer or monomer mixture is expelled from the mold cavity and rests on or between flanges that surround one or both mold portions. Upon polymerization this excess material forms an annular (HEMA) ring around the formed lens between the flange portions of the molds.

As discussed in the above-mentioned U.S. Pat. Nos. 5,039,459, 4,889,664, and 4,565,348, there is the requirement that the materials, chemistry, and processes be controlled so that the mold portions may be separated without having to apply an undue force, which may be necessary when the lens sticks to one or more of the lens mold or when the lens mold portions are adhered to each other by the excess HEMA ring after polymerization.

The prior art process for separating the mold portions and removing the lens therefrom consists of a heating stage, a mold half separation stage, and a lens removal stage. The heating stage of the prior art lens removal process is to apply heated air to the back mold portion thereby causing a differential expansion between the heated mold polymer and the cooler lens polymer. This differential expansion provides a shearing impetus which weakens the adhesion forces between the mold surface and the lens formed thereon. The mold half separation stage, which follows the heating stage is characterized by removal of the previously heated mold half. With respect to prior art systems for removing the back curve mold halves, inefficient means and damaging forces associated therewith have rendered such devices less desirable for producing high quality lenses, inasmuch as the steps of heating and separation that break the polymerized lens/polymer mold adhesion and provide access to the nearly formed lens occasionally damage the lens, and thereby decreasing the yield rate of the process.

With respect to the temperature gradient between the mold halves and the lens, the larger the thermal gradient, the more reduced will be the residual adhesion forces present between the lens and the mold halves, and correspondingly, the more reduced will be the force required to separate the mold portions. Conversely, the lower the thermal gradients created between the mold halves and the lens, the greater will be the required force to separate the mold portions. The greater the forces which may be required in separating the mold from the lens, the greater becomes the possibility of fracturing a mold portion and/or damaging the lens. Furthermore, it is to be understood that a process in which a thermal gradient must be applied on a repeated basis must be such whereby the environment does not heat appreciably, therein reducing the effectiveness of the process.

With respect to the separation of the mold halves, and thereby, the separation of the top mold half from the lens, it is understood that devices must be employed which do not damage, or apply undue stress on the contact lenses. When front and back curve mold parts, which are designed to form an integral frame such as are illustrated in U.S. Pat. No. 4,640,489, are placed together to form a lens shaped volume therebetween, the resultant combined structure provides limited accessible space for a separating means to engage and displace one mold from the other. Even minimal warpage of either mold half can adversely affect both accessibility to the space as well as the accuracy of the displacing forces.

The same requirements apply to the removal of the lens from the mold section in which it remains after separation.

Presently, as widely employed in the technology and as described in European Patent 0 775 571 A2 "Infra-red Heat Source for Demolding Contact Lenses" which is commonly assigned to the assignee of the present application, in order to assist in the demolding of the lens from the mold section there is employed infra-red heat source providing a thermal gradient wherein the infra-red energy is directed against the back curve of the mold through the intermediary of reflective tubes or buffers. In that instance, the structure as described that publication employs quartz or sapphire windows on the infra-red heater which filters out some of the infra-red radiation. This necessitates a longer period of heating and consequently lengthier demold times are required for demolding the lenses. Furthermore, pursuant to the foregoing construction, the infra-red heater employs one heater for multiple molds, in effect one heater for four molds, which in essence does not take into consideration potential variations in heat distribution among the various molds due to the presence of only a single infra-red heat output across the current sources for a plurality of molds.

Pursuant to another embodiment of the prior art, the thermal gradient which assists in the demolding of the lenses comprises the employment of a plurality of steam injection tubes each of which directs a jet of steam onto the concave surfaces of a back curve section. Pursuant to further variation described in the European patent publication, the thermal gradient is provided by a laser wherein a selected amount of concentrated, coherent light energy is directed at the back curve mold section, with the absorption thereof by the back curve providing the necessary thermal gradient.

In general, the process of providing the necessary thermal gradient, as indicated with the use of quartz or sapphire windows on the infra-red heater, filters out a portion of the infra-red radiation, and requires lengthier demolding times. In effect, the quartz glass surrounding the infra-red heating element is subject to breakage and causes an efficacy problem. Consequently, in order to protect the product from this problem, an additional hard protective window was required, in the nature of a sapphire protective window. However, the combination of the quartz element tube employed in the prior art and the sapphire protective window effectively attenuates the infra-red energy associated with these materials, thereby reducing the available output of the heat source and limiting the use of longer wavelength infra-red energy to excite the lens molds in order to derive the desired temperature gradients.

SUMMARY OF THE INVENTION

Accordingly, in order to further improve on the foregoing infra-red heat, or steam and laser devices employed to provide the necessary thermal gradient which assists in the demolding of the lenses, pursuant to the invention there is contemplated the provision of a novel infra-red radiation or heater device constituted of silicon carbide IR-emitters, and which employs an individual infra-red emitter for each individual mold, as opposed to the foregoing prior art construction which employ one infra-red heater for multiple molds.

The foregoing improvement also enables the use of an unfiltered infra-red emitter heating device whereby it is possible to achieve a precise control over the heating temperature for each individual mold rather than for conjointly a plurality of molds.

The elimination of the quartz and/or sapphire window on the infra-red heater which is utilized in the prior art also eliminates the filtering out of portions of the infra-red radiation, thereby providing a greater degree of efficiency by reducing the time of demolding required due to a greater portion of the generated infra-red radiation being received by the molds. Pursuant to the present invention, the independent control of the infra-red energy being emitted to each individual lens assembly facilitates the varying of the input wattage to each element or set of elements, whereby the magnitude in infra-red spectra profile can be readily adjusted in conformance with the requirements of each mold. In effect, higher wattages respond with high output in full wave distribution, whereas lower wattages respond with lower total output in a spectral shift away from short-wave infra-red emittance. Medium and long wave spectrum are more desirable for the demolding process.

In addition to the foregoing, pursuant to the invention there is also contemplated the provision of a preheating step in the production sequence prior to demolding of the lenses, in which a slight amount of heat in the process cycle preceding the demolding step utilizes any suitable heating source, such as an infra-red lamp, having a feedback control loop sensing the temperature at the demolding device, which enables thermal control over the molds to be within a specified temperature range upon entering the demolding station of the manufacturing system, thereby farther enhancing the efficiency of and reduction in demolding time.

Accordingly, it is a primary object of the present invention to provide an efficient and reliable means for applying a controlled thermal gradient to the unseparated mold sections, thereby providing a sufficient relative shear force to break the adhesion between the contact lens and the mold section.

It is another object of the present invention to provide a silicon carbide (SiC) IR-emitter heating device for demolding ophthalmic lenses that can easily and consistently separate the contact lens mold portions having a contact lens formed therebetween without damaging the lens.

Another object of the instant invention is to reduce contact lens manufacture process time by separating the greatest number of back curves from front curves in a rapid manufacturing line thereby permitting the fast and efficient production of hydrophilic contact lenses.

Pursuant to a more specific object of the present invention, a thermal gradient is provided at the demolding station through the provision of an infra-red emitter for demolding the lenses, wherein a ceramic infra-red emitter has a head portion constituted of silicon carbide enabling the emitting of unfiltered infra-red radiation without the need for a further quartz or sapphire window on the infra-red heater as required in the current technology.

Moreover, pursuant to a further aspect of the invention, it is an object to preheat the molds by means sensing the temperature at the demolding station and to relay the sensed information through a feedback loop to a preheater so as to ensure that the mold enters the demolding station while preheated to a specified temperature, thereby further decreasing the amount of time required for demolding.

Pursuant to another aspect of the invention, the inventive silicon carbide infra-red emitter which is utilized in the heating device for demolding the lenses employs a separate infra-red emitter for each separate lens mold, thereby enabling each mold to be thermally controlled so as to be within a specified thermal gradient required for the highly efficient and rapid demolding of the lenses.

The foregoing and other objects are attained by an apparatus for separating a back mold half from a front mold half of a contact lens mold assembly useful in the production of contact lens. Each of the front and back mold halves has a central curved section defining opposing concave and convex surfaces, and also has a circular circumferential flange which extends outward from the central portion. The concave surface of the front curve provides the shape defining surface of the front portion of the contact lens. Conversely, the convex surface of the back curve mold half provides the shape defining surface of the back portion of the contact lens. The fabrication of the contact lens, as set forth conceptually hereinabove, is carried out by placing a predetermined amount of monomer in the concave portion of the front curve, positioning the convex surface of the back curve mold section into the concave portion of the front curve mold section, and subsequently subjecting the monomer to curing or crosslinking, therein providing the lens shape to the hydrophilic material. The term "cured" will be used herein to cover any reaction mechanism, including crosslinking, used to form the contact lens. The paired front and back curve mold sections may be transported through much of the fabrication line on pallets, each pallet containing a plurality of paired curve molds. Alternatively, the mold sections may be transported via another means, such as a conveyor or pusher rods, and may be transported individually or in plurals by such means. In the preferred embodiment the back curve rests on top of the front curve; however, the opposite is contemplated by this invention.

The mold separating and lens removal apparatus, which is positioned in the manufacturing line at a position downstream from the station wherein the lens material is cured, comprises a device for applying a thermal gradient to the concave surface of the back mold half, thereby providing a differential expansion which causes an adhesion breaking shearing force between the convex surface of the back mold half and the contact lens. As stated above, it is understood that the greater the thermal gradient, the greater the effectiveness of the adhesion breaking. Temperature gradient ranges from about 2.5 EC to 12 EC are desirable.

Pursuant to the invention as described in further detail hereinbelow, the required thermal gradient for assisting in the demolding of the lenses is provided by an infra-red heat source, this heat energy being directed at one of the mold curves through the intermediary of a silicon carbide (SiC) emitter heating device, whereby the device is constructed such that an individual silicon carbide infra-red emitter is associated with respectively each one of a separate mold of a plurality of molds which are transported to the demolding station on a pallet. In the preferred embodiment as described herein, the heat energy is directed at the back curve mold half, although the de-mold process would be as effective if the heat energy were directed at the front mold half instead of at the back mold half. This invention is therefore not limited to the application of heat to only the back mold half, and the front mold half could be substituted for the back mold half in the demold apparatus and method described below. However, the lens will remain adhered to the mold half that is not heated.

Pursuant to a further aspect, associated with the silicon carbide infra-red emitter which provides for the thermal gradient in the heating of the mold, there is provided a preheating step in the process, which incorporates a feedback control loop measuring the temperature sensed at the demolding station so as to raise each mold to within a specified temperature range upon entering the demolding station, such as within 57–65° C., prior to the application of the demolding temperature gradient by the silicon carbide infra-red emitters.

Once the temperature gradient, supplied by the above device, has weakened the adhesion forces between the back curve mold sections and the corresponding lenses, an apparatus which is directed to complete the separation of the mold sections by mechanical means is introduced in the form of pry fingers between the front and back curve mold sections.

In one such embodiment, as described in EP 0775 571 A1, the separation apparatus comprises two pairs of opposing thin shims, oriented parallel to the direction of the advancing pallet, which are initially disposed on top of one another, and which together slide between the lateral extending flanges of corresponding front and back curves. Once so positioned, the upper ones of each pair shims is raised, therein lifting the back curve molds upward and away from the secured front curves and the lenses thereon. The removed back curves may be transported to a waste disposal area by a variety of devices, such as a plurality of suction cups. In a second variant, the separation device comprises an eccentric cam driven prying means mounted transverse to the direction of the advancing pallets as disclosed in U.S. Pat. No. 5,770,119 assigned to the assignee of the present invention. This prying means includes a first set of securing fingers which engage the front curve mold sections and hold them stationary as a second set of pry fingers, translated eccentrically, first pivotally and then substantially upwardly, engage the corresponding back curve mold halves. These prying fingers bias the back curve molds at a predetermined force with respect to the associated front mold halves, thereby effectively removing the back mold halves therefrom, and exposing the lenses. In a third variant, the separation device comprises a dual linkage, lifting device, mounted parallel to the direction of motion of the pallet stream that demolds the mold sections in pairs. This device includes thin retainer elements which slide between the flanges of the front and back curves as a pallet carrying the molds advances. The retainer elements secures the front curve mold sections to the pallet and prevents them from translating upward. As the front curve halves are secured by the retainer elements, a set of separation fingers, shaped for fitted engagement with the flanges of the back curve mold sections translates upward via a dual motion linkage system. The upward translation of the separation fingers lifts the back curves away from the stationary front curves and the pallet, thereby exposing the lenses, one pair of lenses at a time.

BRIEF DESCRIPTION OF DRAWINGS

Further benefits and advantages of the present invention will become apparent from a consideration of the following detailed description in conjunction with the accompanying drawings, illustrative of preferred embodiments and variations of the invention:

FIG. 5 is a diagrammatic front elevational view of the inventive infra-red demolding heater device for imparting a thermal gradient across the back curve mold and the lens formed thereunder;

FIG. 6 is a side elevational view of the infra-red demolding heater device illustrated in FIG. 5;

FIG. 7 is a top plan view of the infra-red demolding heater device of FIG. 5 for imparting a thermal gradient across the back curve mold and lens formed thereunder;

DETAILED DESCRIPTION OF PREFERRED EMBODIMENT

The ophthalmic lens to be demolded in the practice of the present invention is preferably formed in a volume defined between front and back contact lens mold portions, each of which are formed by the processes set forth in U.S. Pat. No. 5,540,410, assigned to the assigned of the present invention, and the disclosure of which is incorporated by reference herein.

Figure 1:
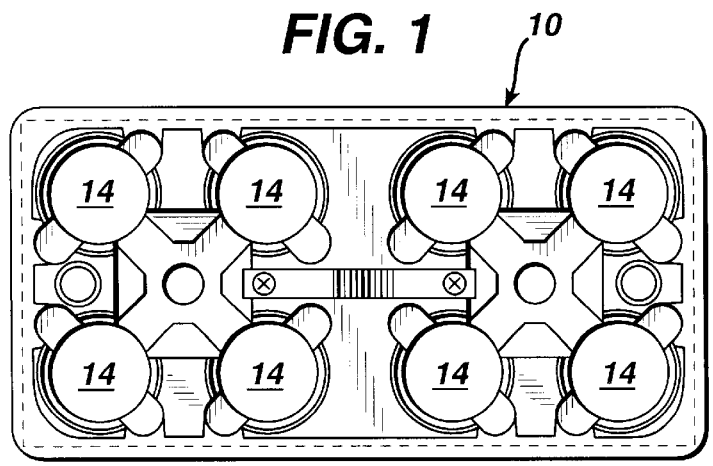
FIG. 1 is a top plan view of a production line pallet, used to transport a plurality of contact lens molds throughout a contact lens production facility.
Figure 2:
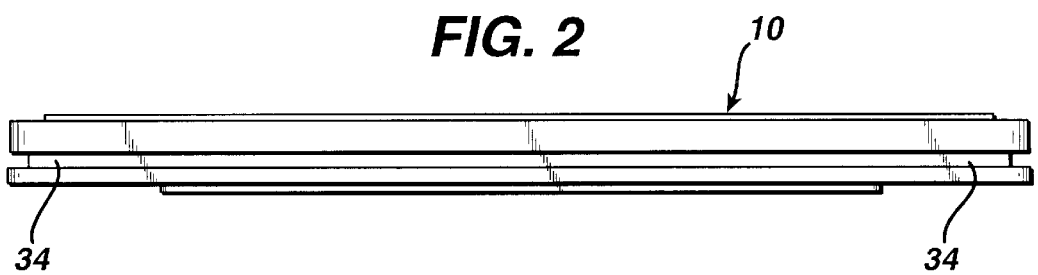
FIG. 2 is a side elevational view of the production line pallet.
Figure 3:
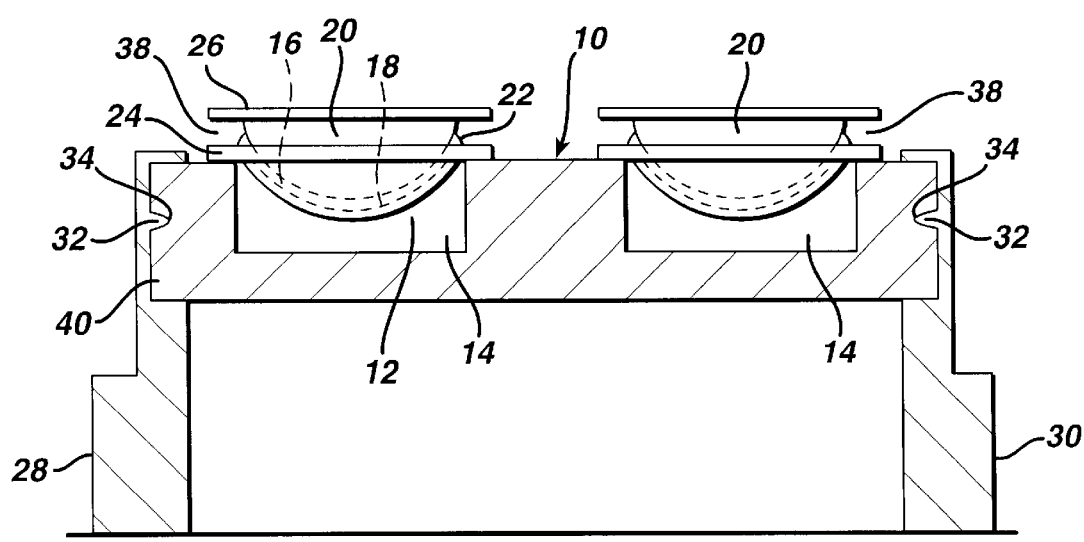
FIG. 3 is a front view of two lens molds situated in respective cavities of the lens mold pallet.

More particularly, the front and back curve mold portions are preferably transported through the manufacturing line on pallets 10, one of which is shown in FIGS. 1 and 2. Referring also to FIG. 3, it is understood that the front curve portion 12 of the mold is carried within one of the plurality of recesses 14 defined by the pallet 10. In the presently illustrated embodiment of the pallet 10, the pallet 10 has the capacity to carry up to eight front curve molds in its recesses 14. During the process by which the lens is formed, the concave portion 16 of the front curve mold 12 is partially filled with a monomer solution 18 (which becomes the contact lens), and then receives the convex portion of back curve mold 20 therein. The back curve mold 20 is seated within the concave portion 16 of the front mold half 12 under a vacuum to avoid the possibility of trapping an air bubble in the monomer. The mold halves 12, 20 are then clamped squeezed together to displace excess monomer 22. The excess monomer 22 collects in a ring around the periphery of the curved portions of the mold halves 12, 20. Inasmuch as each mold half 12, 20 includes circumferential flange portions 24, 26 respectively, the excess monomer collects in a space therebetween. The pallet 10 travels along a process path while guided by along tracks 28, 30 having each inwardly directed transverse ribs or projections 32 engaged in side recesses or grooves 34 formed in the pallet 10.

The assembled mold halves 12, 20 may then be clamped again and precured in a low oxygen environment. Following precure, the lenses are fully cured with heat and UV radiation which causes the complete polymerization of the monomer matrix of the contact lens.

The annular flanges 24, 26, formed at the circumferential periphery of each lens mold portion 12, 20, has the additional purpose of providing a site at which an external apparatus may be employed to facilitate the separation of the lens molds 12, 20 to access the newly formed lens. This separation step, however, is preceded by the application of a thermal pulse to the back curve mold 20. The purpose of this thermal pulse is to establish a thermal gradient between the interface of the back curve 20 and the newly formed lens L. This gradient causes a differential expansion of the back curve with respect to the lens therein reducing the adhesion of the lens L to the back curve 20. The device for establishing the thermal gradient comprise the novel aspects of the present invention, and is described in detail below.

First, however, referring specifically to FIG. 2, in which a side view of the pallet 10 is shown, it is necessary to set forth the important features of the mold carrier. In order to insure that the continuous stream of pallets 10, which characterize a fully functional automated fabrication line, travels smoothly and consistently, each pallet includes the groove 34 formed in the side thereof. These grooves 34 are designed to engage the transverse ribs 32 which thereby minimize possible vertical motion of the pallet 10 during fabrication steps, such as the demolding and separation stage which is the subject of the present invention.

More particularly, with respect to FIG. 3, which is a front view of a pallet 10 carrying a pair of assembled molds 38 (each comprising a front curve 12 and a back curve 20, having a newly formed contact lens L disposed therein), the engagement of the side grooves 34 of the pallet 10 and the set of transverse ribs 32 which extend along the inner surfaces 40 of a conveyor line is demonstrated. A suitable registration means (not shown) may also be included for locating the pallets along the conveyor path, therein holding the pallet absolutely fixed for fabrication stages, such as the demolding station.

The Device for Applying the Thermal Gradient

Figure 4:
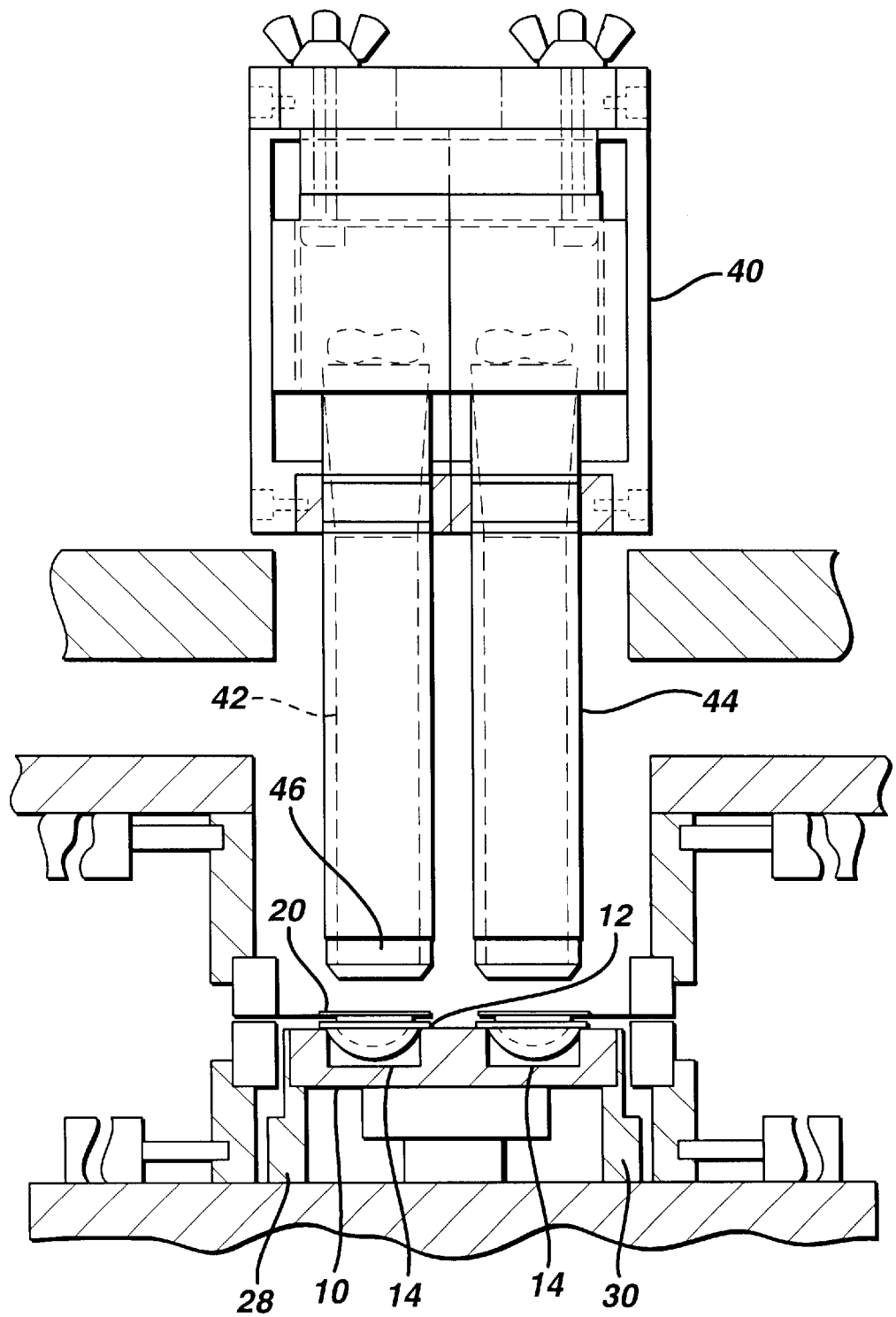
FIG. 4 is a diagrammatic front elevational view of an infra-red demolding device for imparting a thermal gradient across a back curve mold and the lens formed thereunder pursuant to the prior art.
Figure 8:
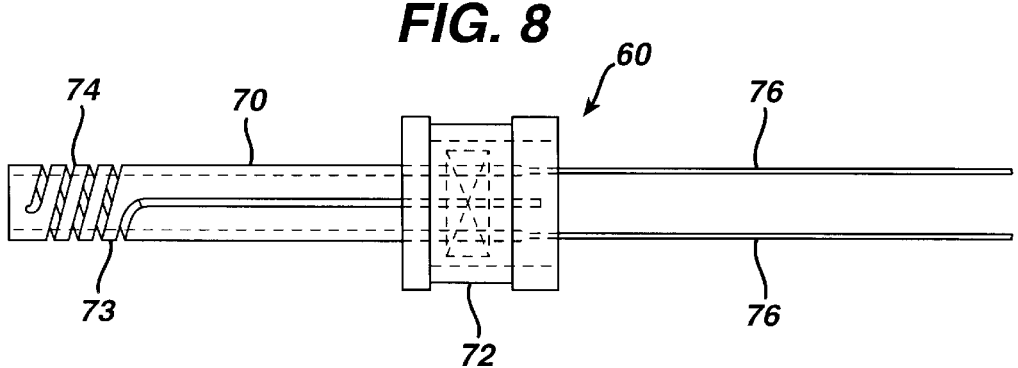
FIG. 8 is a detail view of the silicon carbide IR-emitter of the device of FIG. 5.

As illustrated in FIG. 4 of the drawings, there is diagrammatically represented an infra-red heating apparatus for generating a thermal gradient pursuant to the prior art, particularly as represented in European Patent EP0 775 1 A2.

In that instance, a vertically reciprocating housing 40 containing infra-red heating elements 42 and reflected tubes 44 are adapted to have the heating heads 46 of each of the heating elements come into close contact with the back half mold portion 20. In this particular apparatus each of the heating elements is provided from a single current source, so as to prohibit any adjustment of variations in the temperatures of the respective heating elements which are adapted to contact the respective mold halves, of which 8 are present in each pallet 10. The preferred embodiment does not include the prior art constructions which are extensively discussed in the European patent which discloses heating elements that incorporate quartz windows and protective sapphire windows which reduce the amount of heat being conveyed to the mold half portions by the heating elements, consequently reducing the efficacy and the efficiency of the apparatus due to a more extensive heating period required to provide the desired thermal gradient.

Referring now to FIGS. 5 through 8, each of which illustrate different views and details of an inventive infra-red heating device 50 for generating a thermal gradient across the back curve mold portion and the lens formed therebelow.

The infra-red heating device 50 pursuant to the present invention which provides the desired thermal gradient in the implementation of the separation between the mold halves 12, 20 between which the lens is formed, includes a housing structure 52 comprising an upper housing portion 54 which is equipped with terminal strips 56 that are connected to an electronic control system and related power source equipment (not shown). The lower portion 58 of the housing structure 52 comprises a water-cooled housing through which there pass a plurality of upwardly or vertically extending silicon carbide (SiC) infra-red emitters 60. These silicon carbide infra-red emitters 60 are adapted to impart a predetermined amount of heat to the molds in the pallets 10 which are positioned therebeneath at this demolding station. Each of the infra-red emitters 60 comprises an outer sleeve 62 of essentially cylindrical configuration, which sealingly extend through the water cooled housing 58, and the lower ends of which sleeves 62 are adapted to be in close contact with the upper or back mold half 20 during the heating thereof, based on the downward displacement of the housing structure 52 during operation. Contained within each of the sleeves, as shown in more specific detail in FIG. 8 of the drawings, is an igniter assembly 70 which includes a ceramic bushing 72 sealingly positioned at the upper portion of the water cooled housing 58, so as to seal the sleeves 62 against the ingress of cooling water. Extending downwardly from the ceramic bushing 72 is an igniter portion 73 which at the lower end thereof is adapted to form the electrical heating contact with the back curve mold half 20. This igniter portion 73 includes a spirally grooved lower end 74 adapted to receive electrical wire leads 76 extending upwardly into electrical engagement with the terminal strips 56 for each of the infra-red emitters 60.

Within each of the sleeves 62, there is positioned, towards the lower portion thereof, a reflective mirror element 78 which may contain either a frusto conical mirror source or parabolic reflector adapted to project the desired amount of heat onto the surface of the back curve 20 of the mold located therebeneath.

Each of the infra-red emitters 60 is controlled by a separate source of electrical current so as to be able to adjust the amount of heat generated upon contact with the back half mold portion 20 in order to provide the desired thermal gradient at maximum efficiency and minimum amount of time.

In the preferred embodiment, each silicon carbide emitter 60 is unfiltered, by being quartz-free and sapphire-free, by eliminating the windows and resultant IR filtering, as in the previous instances known from the prior art as represented by the European Patent 775 571 A2, the infra-red radiation is unfiltered and consequently the heat losses are considerable reduced in comparison with the prior art heaters, thereby considerably shortening the heating time required for the demolding of the lenses. Furthermore, by being unfiltered, the present silicon carbide infra-red emitter requires less energy in order to generate a greater amount of heat, and enables a longer wavelength of the infra-red radiation to be employed for heating the mold.

Pursuant to the invention, each infra-red emitter 60 representing a individual irradiating heat lamp irradiates only a single mold, unlike the prior art wherein four molds are serviced by a single IR-heat lamp. The present construction facilitates the utilization of individual temperature regulation for each mold so as to optimize the thermal gradient for each respective mold while concurrently reducing the heating and demolding time.

In order to achieve a maximum efficiency both as to required heating time and reduction in energy, it is advantageous to be able to preheat the molds prior to the applying of the demolding thermal gradient, preferably as shown by means of the silicon carbide infra-red emitters 60. To that effect, suitable sensors (not shown) may be positioned proximate each of the molds, and connected to a preceding processing station (not shown) wherein suitable heating means may provide for preheating of the molds located in the pallets 10 prior to the latter being advanced into the demolding station represented by the present silicon carbide IR-emitter heating device 50. Thus, there may be temperature feedback information provided by the sensors to the preceding preheating station so as to afford preheating of the molds to a temperature range of approximately within 57–65° C. at their entering the demolding station. This can be implemented by an infra-red lamp, forced air heater, or any other type of convection or radiant heat source in the preheating station, as may be required. The feedback provided by the sensor may measure voltage and current and can employ a PID controller (proportional, integral and derivative controller) to regulate the required length in time of infra-red radiation heat produced by each respective infra-red emitter in connection with its associated mold on the pallet, thereby assuring a uniformity of thermal gradients and separation between the mold halves not at all attainable in the previous constructions.

Figure 10:
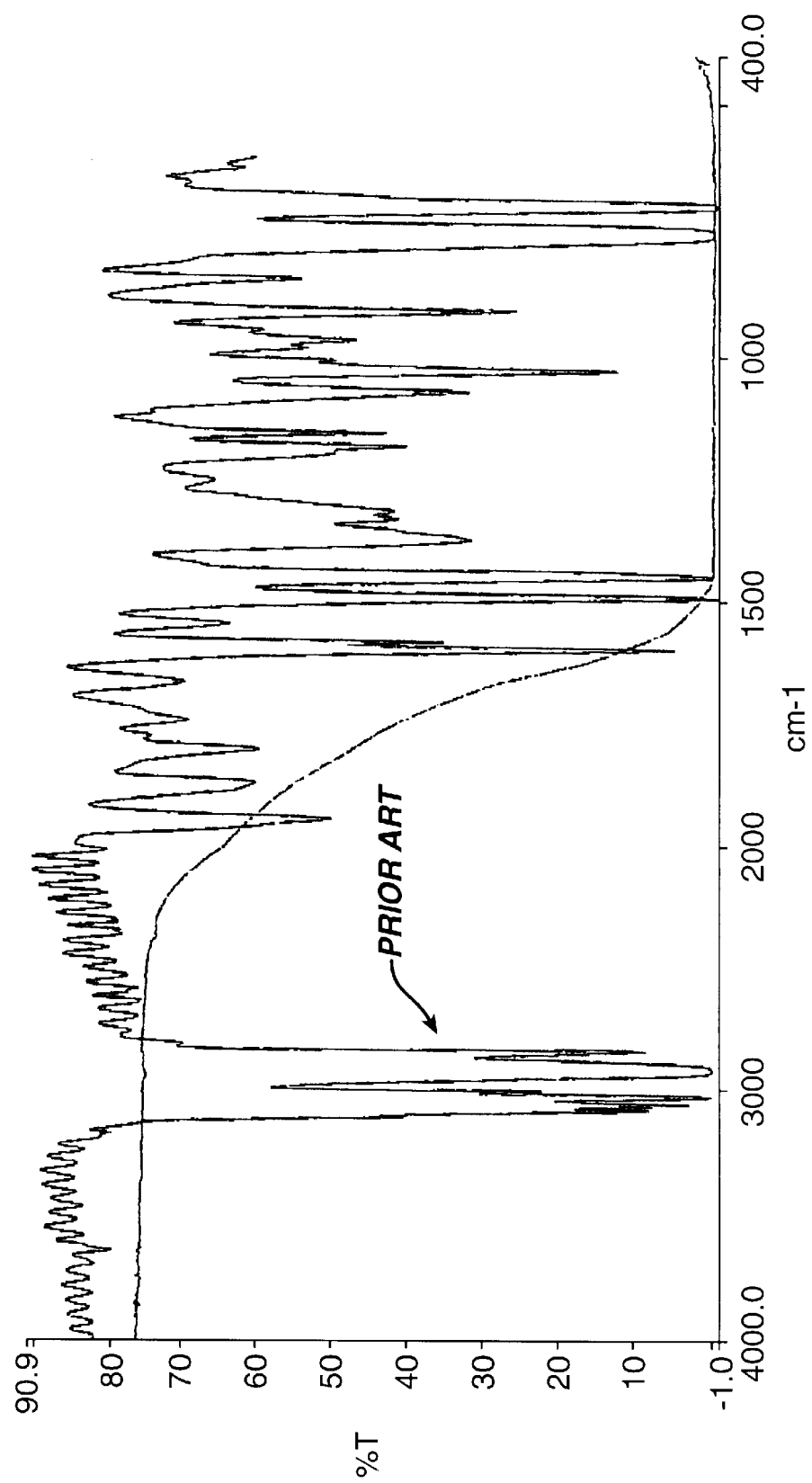
FIG. 10 is a graphical representation of the advantages of the silicon carbide IR-emitter of the heater device compared with prior IR-heaters for attaining the desired thermal gradient.

As shown in FIG. 10 of the drawings in a graphical representation, the left hand portion of the graph essentially represents the peaks which are attained during heating with the prior art systems utilizing quartz and sapphire windows, wherein the mold is constituted of polystryene mold. To the contrary, by removing the quartz and sapphire windows, there was achieved a peak representation, as shown at the right hand portion of the graph, demonstrating that these peaks enable a more rapid heating of the molds for the separation of the halves thereof. Presently, by using the apparatus and method of this invention, the mold halves require approximately one and one half seconds or less to reach demold temperature, as compared to four seconds or more required by the prior art system and method.

The foregoing device for applying the thermal gradient pursuant to the invention may be utilized in conjunction with mechanical separating means, which are not the subject of this invention, of which one optional embodiment of the various known embodiments utilizing pry fingers as illustrated in European Patent O 775 571 A2, the details of which are incorporated herein by reference, and the description set forth hereinbelow is merely for purpose of providing a more comprehensive understanding of the overall aspects of the mold separating arrangement.

An unexpected result of this inventive SiC heater device 50 is a major reduction in the "center pull" defect. This defect is associated with the excessive heat that the target mold receives at the center of the heating area with previous methods. The SiC heating element used in this device is shaped as a hollow cylinder with the base end facing the target mold. The direct IR energy that the mold receives is shaped symmetrically to the mold assembly with the center receiving a proportionally reduced amount of energy compared to other methods. This shaping of the IR energy distribution results in a reduction of defects that can be introduced during the demold process. The IR energy from the side of the silicon carbide cylindrical emitter is reflected down toward the mold using a cone mirror or parabolic mirror. This results in a more desirable and symmetrical heating pattern.

Means for Separating the Thermally Loosened Mold Sections

The mechanical demolding assemblies or devices of the mold separation apparatus may comprise a variety of different variations, one of which is illustrated hereinbelow. It shall be understood, that while variations may be described in conjunction with the above described means for applying a thermal gradient, various other types of separation means may be equivalently utilized with the disclosed means for loosening the back curve molds 20 from the lenses.

Figure 9:
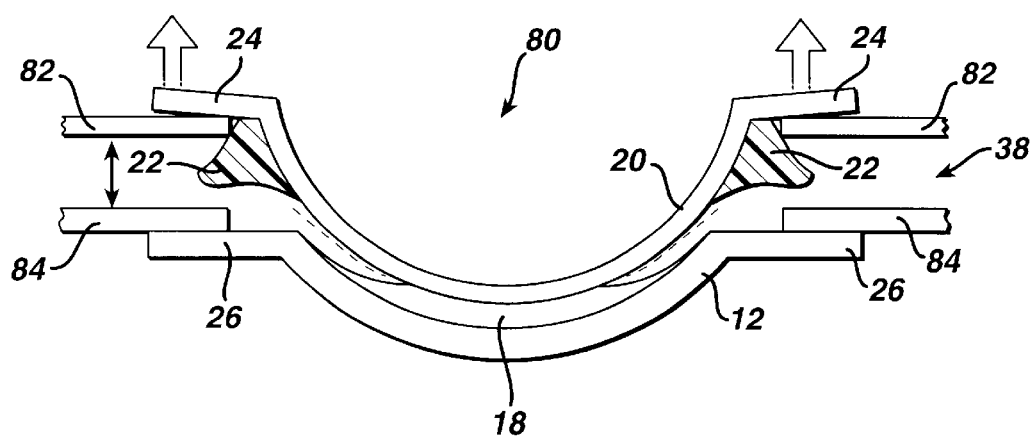
FIG. 9 is a side view of a separating mold section, illustrative of the operation of the mechanical separation means.

Basically, as shown in FIG. 9, the separation means function by mechanically prying the back curve mold half 20 from the front curve half 12 of each contact lens mold assembly 38. The prying process occurs under carefully controlled conditions, with somewhat different force vectors, so that the back curve half will be separated from the front curve half without destroying the integrity of the lens formed in the lens mold.

The separation device 80 includes two pairs of separating shims 82, 84 on either side of the molds for each conveyor line. Each of the pairs of shims 82, 84 are introduced between the flanges 24, 26 of corresponding front and back curves 12, 20. When separated, one 84 of each of the pairs of shims hold the front curves 12 down on the pallet 10, and the second 82 of each pairs of shims is raised, lifting the back curve 20 off the pallet, separating it from the lens beneath. This operation is described in detail in conjunction with the infra-red thermal gradient application as set forth hereinabove.

It is understood that each set of shims 82, 84 is inserted in a manner such that the finger portions of the shims anchor the annular flange portion 26 of the front curve 12 of the lens mold to the surface of the pallet 10, and that the finger portions of the top shims 82, by action of a vertical drive means (not shown) lift and vertically separate the back curve mold portions 20 from the front curve mold portions without destroying the integrity of the contact lens or either of the mold portions.

It has been found that by properly controlling the lift rate of the top shim 82, so as to mimic a constant force (in contrast to a constant linear motion) lift, a higher effective yield may be achieved. The specific profile of the pseudo-constant force lift may be determined empirically off-line and then applied uniformly to all mold pairs with considerable effectiveness.

In the illustrated embodiment, a 2 mm space exists between the mold flanges 24, 26, and the combined thickness of the upper and lower separation shims is approximately 1.5 mm. After insertion, the shims are separated at a velocity of 10 mm/sec for a distance of 1 mm, thus providing a small preload to the mold halves. The separation velocity is 0.6 mm/sec for a separation distance of approximately 1.3 mm, and then a high velocity lift off at the maximum velocity of the device motor.

In an alternate embodiment, each pair of laterally disposed shims separates slightly after insertion in order to preload the front and back curves, thereby providing a small bias apart prior to the application of a thermal gradient.

After the preload is established, the infra-red emitters 60 are energized and the back curve 20 heated under preload. This provides essentially a mold release from thermal energy, assisted by mechanical energy.

It may be understood that such above-described mechanical assistance is best supplied just after heating, although no adverse effects would be contemplated if there was less time between the application of a thermal gradient to break adhesion and mechanical removal. In practicable manufacturing terms, the time between thermal exposure and mold separation is between about 0.2 and about 1.5 seconds.

The present invention, which comprises an apparatus and method of manufacturing contact lenses including the loosening and separating of mold pairs used in the fabrication of the lenses, after the lenses have been formed therebetween, has been set forth hereinabove with reference to a preferred embodiment.

While the invention has been particularly shown and described with respect to a preferred embodiment thereof, it will be understood by those skilled in the art that the foregoing and other changes in form and details may be made therein without departing from the spirit and scope of the invention.

What is claimed is:

1. An apparatus for demolding one or more lenses formed between one or more pairs of front and back mold halves, said apparatus comprising:
one or more silicon carbide IR-emitters for directing a predetermined amount of infra-red energy at each said one or more pairs of mold halves to thereby provide an individually controlled thermal gradient between said mold halves, wherein each said silicon carbide IR-emitter is arranged within a cylindrical sleeve, and a cooling housing encompasses one or more said cylindrical sleeves to inhibit excessive heating of said one or more silicon carbide IR-emitters.

2. An apparatus as claimed in claim 1, further comprising reflector means arranged in each said sleeve extending about a head portion of each said one or more silicon carbide IR-emitters so as to direct the infra-red energy towards the respective one or more pairs of mold halves for controlled heating thereof.

3. An apparatus as claimed in claim 1, wherein said reflector means comprises a reflecting surface for directing said infra-red energy.

4. An apparatus as claimed in claim 3, wherein said reflecting surface possesses a frusto-conical configuration.

5. An apparatus as claimed in claim 3, wherein said reflecting surface forms a parabolic reflector.

6. An apparatus as claimed in claim 1, wherein each said one or more silicon carbide IR-emitters is connected to a source of electrical current to facilitate varying the heat being conveyed to each respective therewith associated back curve mold half of each said one or more pairs of mold halves so as to impart the required thermal gradient to each said respective pair of mold halves.

7. An apparatus as claimed in claim 1, wherein means for sensing the temperature at each back curve mold half form a feedback of each said temperature to a preheater for preheating said one or more back curve mold halves to a predetermined temperature prior to each said one or more silicon carbide IR-emitters imparting said thermal gradients to each of said one or more pairs of mold halves.

8. An apparatus as claimed in claim 7, wherein said one or more back curve mold halves are each preheated to a temperature of between about 57–65° C. prior to being subjected to infra-red energy from said one or more silicon carbide IR-emitters.

9. An apparatus as claimed in claim 7, wherein said temperature feedback measures voltage and current for each said one or more silicon carbide IR-emitters, and regulates the voltage and current to provide the required thermal gradient for each said one or more pairs of mold halves.

10. An apparatus as claimed in claim 9, wherein said voltage and current is regulated by a PID controller.

11. An apparatus as claimed in claim 1, further comprising means for separating each of said associated front and back curve mold halves subsequent to the application of the thermal gradient thereto by said one or more silicon carbide IR-emitters.

12. A method of demolding one or more lenses formed between corresponding one or more pairs of front and back curve mold halves, said method comprising:
separately having one or more silicon carbide (Sic) IR-emitters directing predetermined amounts of infra-red energy at each said one or more pairs of mold halves to thereby provide an individually controlled thermal gradient between said pair of mold halves, each of said silicon carbide IR-emitters is arranged within a cylindrical sleeve, and a cooling housing collectively encompasses said, one or more cylindrical sleeves to inhibit excessive heating of said one or more silicon carbide IR-emitters.

13. A method as claimed in claim 12, wherein reflector means are arranged in each said sleeve extending about a head portion of each of said one or more silicon carbide IR-emitters so as to direct the infra-red energy towards the back curve mold halves for controlled heating thereof.

14. A method as claimed in claim 13, wherein said reflector means comprises a reflecting surface for directing said infra-red energy.

15. A method as claimed in claim 14, wherein said reflecting surface possesses a frusto-conical configuration.

16. A method as claimed in claim 14, wherein said reflecting surface forms a parabolic reflector.

17. A method as claimed in claim 12, wherein each said one or more silicon carbide IR-emitters is connected to a source of electrical current to facilitate varying the heat being conveyed to each respective therewith associated pair of mold halves so as to impart the required thermal gradient to each said respective pair of mold halves.

18. A method as claimed in claim 12, wherein sensing the temperatures at each back curve mold half provides a feedback of each said temperatures to a preheater for preheating said back curve mold halves to a predetermined temperature prior to said silicon carbide IR-emitter imparting said thermal gradients to each of said pair of mold halves.

19. A method as claimed in claim 18, wherein said back curve mold halves are each preheated to a temperature of between about 57–65° C. prior to being subjected to infra-red energy from said silicon carbide IR-emitter.

20. A method as claimed in claim 18, wherein said temperature feedback measures voltage and current for each said silicon carbide IR-emitters, and regulates the voltage and current to provide the required thermal gradient for each said pair of mold halves.

21. A method as claimed in claim 20, wherein said voltage and current is regulated by a PID controller.

22. A method as claimed in claim 12, further comprising the step of mechanically separating each of said associated front and back curve mold halves subsequent to the application of the thermal gradient thereto by said one or more silicon carbide IR-emitters.

23. An apparatus for demolding a plurality of lenses formed between corresponding front and back mold halves, said apparatus comprising:
   a plurality of means each directing a predetermined amount of energy at a respective associated one of said mold halves to thereby provide a controlled thermal gradient between said mold halves;
   and means to individually control said thermal gradient between each of said front and back mold halves.

24. An apparatus for demolding a plurality of contact lenses formed between corresponding front and back curve mold halves which are positioned in a regular array on a pallet, after formation and curing of said lenses, each of said mold halves having an arcuate central portion and an annular flange portion said apparatus comprising:
   a plurality of means each directing a predetermined amount of energy at a respective associated one of said back mold halves to thereby provide a controlled thermal gradient between each of said back mold halves and the therewith associated energy means;
   and means to individually control said thermal gradient between each of said back mold halves and the therewith associated energy means.

25. A method of demolding a plurality of contact lenses formed between corresponding front and back curve mold halves which are positioned in a regular array on a pallet, after formation and curing of said lenses, each of said mold halves having an arcuate central portion and an annular flange portion, said method comprising:
   separately having sources directing predetermined amounts of energy at a respective associated one of said back mold halves to thereby provide a controlled thermal gradient between each of said back mold halves and the therewith associated energy;
   and individually controlling said thermal gradient between each of said front and back mold halves and the therewith associated energy.

26. An apparatus as claimed in claim 23, further comprising means for sensing the temperature at each back mold half, and wherein said temperature means for sensing the temperature forms a feedback of the temperature to a preheater for preheating said back mold halves to a predetermined temperature prior to said plurality of energy directing means imparting said thermal gradient to said front and back mold halves.

27. An apparatus as claimed in claim 26, wherein said back mold halves are each preheated to a temperature of between about 57–65° C. prior to being subjected to energy from said plurality of energy directing means.

28. An apparatus as claimed in claim 26, wherein said feedback measures voltage and current for each said plurality of energy directing means, and regulates the voltage and current to provide the required thermal gradient for each of said front and back mold halves.

29. An apparatus as claimed in claim 28, wherein said voltage and current is regulated by a PID controller.

30. An apparatus as claimed in claim 24, further comprising means for sensing the temperature at each back mold half, and wherein said temperature means for sensing the temperature forms a feedback of the temperature to a preheater for preheating said back mold halves to a predetermined temperature prior to said plurality of energy directing means imparting said thermal gradients to each of said front and back mold halves.

31. An apparatus as claimed in claim 30, wherein said back mold halves are each preheated to a temperature of between about 57–65° C. prior to being subjected to energy from said plurality of energy directing means.

32. An apparatus as claimed in claim 30, wherein said feedback measures voltage and current for each said plurality of energy directing means, and regulates the voltage and current to provide the required thermal gradient for each of said front and back mold halves.

33. An apparatus as claimed in claim 32, wherein said voltage and current is regulated by a PID controller.

34. A method as claimed in claim 25, further comprising the steps of:
   sensing temperatures at each back curve mold half;
   and preheating said back curve mold halves to a predetermined temperature prior to said directing step.

35. A method as claimed in claim 34, wherein said back predetermined temperature is between about 57–65°C.

36. A method as claimed in claim 34, further comprising the steps of measuring voltage and current for each said source, and regulating the voltage and current to provide the required thermal gradient for each said front and back curve mold halves.

37. An apparatus as claimed in claim 36, wherein said voltage and current is regulated by a PID controller.

* * * * *